United States Patent Office 2,887,772
Patented May 26, 1959

2,887,772

SOLDER COMPOSITION AND METHOD OF SOLDERING USING SAME

David B. Peck, Williamstown, Mass., assignor to Sprague Electric Company, North Adams, Mass., a corporation of Massachusetts No Drawing. Application October 14, 1953
Serial No. 386,125

2 Claims. (Cl. 29—496)

This invention relates to a new and improved soldering process and more particularly relates to an improvement of infra-red type soldering.

For many years the usual and inexpensive means for attaching metal-to-metal structures has been by means of soldering with suitable alloys. Various notifications of the soldering processes have come about so that today, in addition to the soldering technique by means of a gas or electrically heated copper bit, there are such methods as dip soldering, induction heating of the solder, electrode soldering, resistance soldering, and soldering by means of flame. Where it is necessary to join minute areas of metal one to the other or where it is necessary to solder a metallic bond adjacent to materials which are susceptible to thermal decomposition, the blow-pipe method of flame soldering has often been utilized in that extremely small pin-points of flame can be directed upon the surfaces to be joined with the solder. This latter technique, in addition to requiring extremely experienced and versatile personnel, often is not precise enough for a desired operation in that adjacent surfaces are often times injured by the flame, either by being directed upon them inadvertently or by mere exposure to the periphery of the flame. Infra-red soldering suffers from the disadvantage of being quite inefficient and for this reason has not been given consideration by those concerned with bonding metals one to the other.

It is an object of this invention to overcome the foregoing and related disadvantages. It is a further object of this invention to utilize the presently inefficient process of infra-red soldering and by modification to produce an efficient system susceptible to soldering structures without attendent injury to adjacent regions. It is a still further object of this invention to produce a modified solder having a high absorptivity of infra-red radiation and efficient conversion of said radiation into thermal energy. Additional objects of this invention will become apparent from the following description and appended claims.

These objects are achieved in accordance with this invention by the utilization of a solder which has admixed with it a minor amount of substance exhibiting "black body" characteristics for infra-red radiation.

More particularly, these objects are achieved through the use of a solder composition having admixed with the solder minor amounts of flux and a substance exhibiting high absorptivity for infra-red radiation.

It has been found that infra-red soldering becomes a practical means of joining metal-to-metal structures when a suitable solder has dispersed throughout its body, a substance which exhibits a high degree of absorption of infra-red radiation, namely that radiation having a wave length of from .58 to .70 microns. The incorporation of the "black body" material greatly increases the efficiency of the infra-red heating of the solder in that this material exhibiting a high absorptivity of infra-red radiation effectively converts this absorbed radiant energy into thermal energy thus effecting rapid melting of the solder. The "black body" substances which are incorporated in the solder are preferably non-compatible with it and additionally of lower density than the solder so that upon cooling of the bonded materials the particular matter exhibiting the high absorption of the infra-red radiation freezes on the surface of the solder and can thus be readily removed by either mechanical or chemical means. Numerous substances have been found to exhibit the high degree of absorption of the infra-red radiation necessary to achieve a practical means of bonding metal structures by means of energy supplied by said radiation. By the use of the term "black body" is meant those substances which have extremely high absorption of infra-red radiation (in excess of 75% absorption) or conversely stated have extremely low reflection coefficients for the aforesaid radiation. In a visual sense it appears that those substances having a black appearance as a class exhibit the greatest absorptivity of the infra-red radiation. However, grey and green are substantially as effective as the black in absorption of the longer wave length portion of the infrared spectrum when contrasted with the low absorptivity of the yellows and whites. The following list indicates representative inorganic substances which are suitable for admixture with the solder so as to produce a compounded structure having the desired response to infra-red radiation. Barium boride, bismuth selenide, boron carbide, boron silicide, calcium boride, chromium oxide, chromium dioxide, chromium phosphide, chromium sulfide, cobalt oxide, cobalt sulfide, copper chromate, copper solumite, copper sulfide, germanium oxide, indium oxide, manganese oxide, molybdenum carbide, molybdenum phosphide, osmium dioxide, niobium oxide, platinum dioxide, zinc ferrite, graphite, carbon black, all of these exhibit a black appearance to the human eye and additionally are incompatible with the common solders and are of sufficiently high melting points that they are non-reacted during the melting of the solders. However, of less efficiency by some 15%, but nevertheless of sufficient absorption to prove operative with solders heated by infra-red radiation, are those substances exhibiting grey and green visual appearances of which the following are illustrative examples:

*Green.*—Chromic or chromous fluoride, chromic sesqueoxide, ferric fluoride

*Grey.*—Antimony triselenide, antimony tritelluride, barium carbide, barium hydride, beryllium, cobalt silicide, chromium arsenide, chromium carbide, cobalt phosphide

*Grey-green.*—Barium manganate

*Grey-black.*—Copper triphosphide

Also it must be realized that within the infra-red spectrum a material may offer high absorption for a restricted range of wave lengths and relatively low absorption for the rest of the spectrum. Hence those substances exhibiting a black visual appearance are preferred to that operating range of the infra-red spectrum immediately longer in wave length than the visual spectrum, as present day infra-red sources predominate in those wave lengths rather than that portion of the infra-red spectrum approaching a wave length of 0.7 micron. As the absorption appears to be appreciably affected by the surface area of the absorptive matter, this matter should be of limited diameters which is readily accomplished by micropulverizing the particular absorptive material. It has been found that particular matter which passes through a 375 mesh screen is quite suitable for admixture with the solder.

Numerous solders can be used with this invention as the particular alloy which forms the primary portion of the solder does not come within the scope of this invention for it is to a modification of the soldering composition that my invention is directed. The only restriction upon the solder for utilization of a particular type of infra-red absorptive material is that it preferably has a density greater than the admixed substance or that the infra-red absorptive material tends to be swept into the liquid phase of the cooling alloy so that this admixed material is present upon the surface of the alloy and is not dispersed with the body of the alloy resulting in either weakened or porous bonds. The typical solders are the tin lead mixtures with or without additional elements such as antimony, bismuth, cadmium, and indium. Where it is desired to achieve excellent bonding of the metal-to-metal structure where wetability is important, the addition of minor amounts of indium to a lead tin solder affects a much superior bond.

For electrical applications it is preferable to use a non-corrosive flux with the soldering operation. Among these non-corrosive types are the rosins which in many applications are activated by the addition of minor amounts of such compounds as oleic acid, lactic acid, ethylene hydrochloride, naphthalene hydrochloride, etc. A further type of non-corrosive flux is that which exhibits the desired characteristics upon being raised to the soldering temperature and thereafter decomposes or volatilizes itself from the surface of the metal so that it no longer interferes with the soldering process. The flux serves to entrain the oxides and infusible materials which exist upon the surface of the metal so as to prevent them from weakening the bonding of the solder to the surface of the metal. For this reason the soldering flux must rapidly remove the oxide as well as the infusible materials and yet be displaced by the solder as it flows onto the surface of the metal and furthermore the flux must serve as a barrier to reoxidation of the metal surface. There is, however, no particular restriction upon the flux which is utilized with my invention. However, it might be desired in certain applications to have it compatible with the infra-red absorptive material which is admixed so as to achieve uniform dispersion of the components when the flux, infra-red absorptive material and solders are used as a composite system.

As an example of this invention, a limited area upon the the surface of an aluminum can was degreased and thereafter fluxed with a rosin flux containing a small percentage of aniline hydrochloride. A solder mixture of 85 parts tin lead (8 parts of tin to 2 parts of lead) and 15 parts by weight of micropulverized graphite was positioned upon the refluxed area after which infra-red radiation obtained from a 250 watt GE reflector unit was directed upon the solder. The solder rapidly melted and an aluminum wire was positioned in the solder solution after which the radiation was removed allowing the solder to freeze. The surface of the solder bond was cleaned of the graphite particles by slight amount of hand abrasion with steel wool. A further example of this invention is the utilization of a solder pellet containing 75 parts of the tin lead solder, 15 parts of the rosin flux and 10 parts of carbon black. After degreasing a limited area upon an aluminum surface the pellet was positioned upon it and the infra-red radiation from the aforesaid light source was focussed by means of a lens upon the pellet which rapidly melted. Upon melting the surface was fluxed by the rosin within the solder pellet and a lead was bonded to the structure by allowing the solder to cool by withdrawal of the heating source. Anther modification is to utilize aniline black dissolved in the rosin flux and thereafter admixed with the solder to prepare a composite pellet or extruded rod of the solder composition. The rest of the bonding procedure would be essentially as set forth in the preceding examples.

This invention serves to bridge a gap in the field of soldering presently lacking in an efficient means to produce metal-to-metal bonds. The blow-pipe method of flame soldering a minute region was quite deficient in that the surrounding areas were often times damaged by inadvertent direction of the flame upon it, the peripheral radiation from the flame itself, or the splash of the flame after projection upon the surface to be heated. With my efficient infra-red process it is possible to focus the said radiation upon spots having limited surface area or accessibility in a structure such as radio chassis and to occasion the bonding of the metals without thermal degradation of the adjacent structures. In fastening leads onto electrical components it is highly desirable to not expose those structures adjacent to a terminal tab such as a metallized film, liquid and solid organic dielectric materials, to excessive periods of heating such as is attendent with either flame or copper bit soldering. My invention eliminates the above difficulties in that a high intensity source of infra-red radiation can be directed upon the solder containing the high absorptive material rapidly affecting the melting of the solder and bonding of the metals without excessive exposure of the adjacent structures. Any inadvertent direction of the radiation upon the adjacent structures would be merely reflected off without injury, thus avoiding the characteristic thermal degradation found when presently known techniques are used.

As many apparently widely different embodiments of this invention may be made without departing from the spirit and scope hereof, it is to be understood that the invention is not limited to the specific embodiments hereof except as defined in the appended claims.

What is claimed is:

1. A composition for use in joining small metallic contact areas that are immediately adjacent areas subject to thermal degradation, said composition consisting essentially of 60 to 80 parts of solder, 25 to 10 parts of a non-corrosive flux, and 20 to 5 parts of a material exhibiting in excess of 75 percent absorption of infrared radiation, said material being non-compatible with said solder and compatible with said flux, said material further being of a lower density than said solder.

2. A method of soldering electronic components having metallic contact areas immediately adjacent areas subject to thermal degradation, said method comprising the steps of positioning the composition of claim 1 in contact with the surfaces to be joined, then directing infrared radiation on said composition whereby said composition melts by virtue of the high absorptive material before damage to said adjacent areas, and then permitting said composition to cool, whereby said noncompatible lower density absorptive material collects on the surface of said composition so as to leave a pure solder joint between said surfaces.

References Cited in the file of this patent

UNITED STATES PATENTS

| | | |
|---|---|---|
| 1,080,059 | Hatfield et al. | Dec. 2, 1913 |
| 1,531,414 | Ruben | Mar. 31, 1925 |
| 1,980,927 | Parker | Nov. 13, 1934 |
| 2,087,716 | Banscher | July 20, 1937 |
| 2,262,901 | Murphy | Nov. 18, 1941 |
| 2,282,926 | Bates | May 12, 1942 |
| 2,700,623 | Hall | Jan. 25, 1955 |

FOREIGN PATENTS

| | | |
|---|---|---|
| 264,814 | Great Britain | Dec. 22, 1927 |
| 656,482 | France | May 8, 1929 |
| 902,834 | France | Sept. 13, 1945 |
| 664,882 | Great Britain | Jan. 16, 1952 |